(12) United States Patent
Steunebrink et al.

(10) Patent No.: US 12,712,400 B2
(45) Date of Patent: Aug. 18, 2026

(54) WIRELESS POWER TRANSFER SYSTEM

(71) Applicant: KONINKLIJKE PHILIPS N.V., Eindhoven (NL)

(72) Inventors: Tim Patrick Steunebrink, Eindhoven (NL); Pascal Leonard Maria Theodoor Lebens, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 19/131,965

(22) PCT Filed: Nov. 13, 2023

(86) PCT No.: PCT/EP2023/081554
§ 371 (c)(1),
(2) Date: May 22, 2025

(87) PCT Pub. No.: WO2024/110226
PCT Pub. Date: May 30, 2024

(65) Prior Publication Data

US 2026/0189081 A1 Jul. 2, 2026

(30) Foreign Application Priority Data

Nov. 24, 2022 (EP) .................................... 22209426

(51) Int. Cl.
*H02J 50/80* (2016.01)
*H02J 50/00* (2016.01)
(Continued)

(52) U.S. Cl.
CPC ............ *H02J 50/80* (2016.02); *H02J 50/001* (2020.01); *H02J 50/12* (2016.02); *H02J 50/60* (2016.02)

(58) Field of Classification Search
CPC .. H02J 50/12; H02J 50/80; H02J 50/60; H02J 50/10; H02J 50/90; H02J 50/70;
(Continued)

(56) References Cited

U.S. PATENT DOCUMENTS

2011/0025265 A1* 2/2011 Mochida ............... H01M 10/44 320/108
2013/0313911 A1* 11/2013 Bae ......................... H02J 50/80 307/104

(Continued)

FOREIGN PATENT DOCUMENTS

EP 4084281 A1 11/2022

OTHER PUBLICATIONS

International Search Report and Written Opinion from PCT/EP2023/081554 dated Jan. 17, 2024.

*Primary Examiner* — Regis J Betsch
*Assistant Examiner* — Alex W Lam

(57) ABSTRACT

A power transmitter (101) wirelessly provides power to a power receiver (105) via a power transfer signal generated by a power transfer coil (103). During power transfer, a driver (201) generates the power transfer signal to employ a repeating time frame comprising a power transfer time interval and a communication time interval in which the power transfer signal is off. A communication driver (209) generates a communication drive signal for a communication coil (207) to generate a communication carrier signal. Communication between the power transmitter and the power receiver is by modulation of the communication carrier signal during the communication time intervals. The communication driver (205) generates communication carrier signal to be present during the repeating time frame except for in timing gaps which are no more than 50% of a duration of the power transfer time intervals. The set of timing gaps comprises a predetermined pattern of a plurality
(Continued)

of timing gaps. The power receiver extracts power from the communication carrier signal and synchronizes operation based on the timing gaps.

39 Claims, 8 Drawing Sheets

(51) Int. Cl.
*H02J 50/12* (2016.01)
*H02J 50/60* (2016.01)

(58) Field of Classification Search
CPC .......... H02J 50/40; H02J 50/20; H02J 50/402; H02J 7/42; H02J 7/64; H02J 50/00; H02J 50/001; H02J 7/00; H02J 50/005; H02J 7/02; H02J 7/345; H02J 7/50; H02J 7/65; H04W 24/08; H04W 52/367; H04W 92/18; H04W 24/10; H04W 76/27; H04W 24/02; H04W 64/00; H04W 8/24; H04W 72/23; H04W 72/25; H04W 52/383; H04W 52/0216; H04W 76/28
See application file for complete search history.

(56) References Cited

U.S. PATENT DOCUMENTS

| | | | | |
|---|---|---|---|---|
| 2015/0061587 | A1* | 3/2015 | Bruechmann | H04B 5/24<br>320/108 |
| 2017/0070104 | A1* | 3/2017 | Chung | H02J 50/80 |
| 2022/0037936 | A1 | 2/2022 | Ettes et al. | |

* cited by examiner

WIRELESS POWER TRANSFER SYSTEM

CROSS-REFERENCE TO PRIOR APPLICATIONS

This application is the U.S. National Phase application under 35 U.S.C. § 371 of International Application No. PCT/EP2023/081554, filed on Nov. 13, 2023, which claims the benefit of EP Patent Application No. EP 22209426.0, filed on Nov. 24, 2022. These applications are hereby incorporated by reference herein.

FIELD OF THE INVENTION

The invention relates to operation of a wireless power transfer system.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply where power is inductively transferred from a transmitter inductor in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index-.html, where in particular the defined Specification documents can be found.

The Wireless Power Consortium has on the basis of the Qi Specification proceeded to develop the Ki Specification (also known as the Cordless Kitchen Specification) which is aimed at providing safe, reliable, and efficient wireless power transfer to kitchen appliances. Ki supports much higher power levels up to 2.5KW.

In many systems, such as specifically Qi systems, communication from the power receiver to the power transmitter may use load modulation where a load of the power transfer signal is varied in dependence on the data to be transmitted. However, such load modulation may be difficult to detect if the power transfer loading of the power transfer signal varies at the same time. Similarly, communication from the power transmitter to the power receiver may be achieved by modulating the power transfer signal (e.g. amplitude or frequency modulation) but interference to such modulation may be caused by variations in the parameters of the power transfer signal due to e.g. a varying load.

In some systems it has accordingly been proposed to use a completely separate communication approach. Specifically, Ki wireless power transfer systems may establish a two way communication link using the Near Field Communication, NFC, standard. The communication is during the power transfer phase performed in short time intervals in order to avoid or reduce interference between the power transfer and the communication. The power receiver is arranged to detect the NFC carrier to perform the communication during the short time intervals.

During power transfer operation, the power receiver extracts power for a load from the power transfer signal. In many cases, the extraction of power is also used to power e.g. functionality of the power receiver itself, such as processing units, user interfaces etc. However, such an approach requires additional functionality and may not be optimal in all scenarios.

Hence, an improved operation for a wireless power transfer system would be advantageous, in particular, an approach allowing increased flexibility, reduced cost, reduced complexity, improved communication, additional functionality, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for wirelessly providing power to a power receiver via an inductive power transfer signal, the power transmitter comprising: a power transfer coil arranged to generate the power transfer signal; a power transfer driver arranged to generate a power transfer drive signal for the power transfer coil, the power transfer driver being arranged to, during a power transfer phase, generate the power transfer drive signal to employ a repeating time frame comprising at least a power transfer time interval and a communication time interval, the power transfer driver being arranged to generate the power transfer drive signal during the power transfer time intervals and to not generate the power transfer drive signal during communication time intervals; a communication coil arranged to generate a communication carrier signal, a communication driver arranged to generate a communication drive signal for the communication coil to generate the communication carrier signal; a communication unit arranged to communicate with the power receiver using modulation of the communication carrier signal during communication time intervals; wherein the communication driver is arranged to generate the communication drive signal to be present during communication time intervals and during the power transfer time intervals except for during a set of timing gaps during which no communication drive signal is generated, a total combined duration of the set of timing gaps being no more than 50% of a duration of the power transfer time intervals; wherein the set of timing gaps comprises a predetermined pattern of a plurality of timing gaps.

The invention may provide improved performance in many embodiments, and may provide an overall improved power transfer operation in many systems and embodiments. For example, in many embodiments, improved operation and communication may be achieved. The approach may allow efficient and low complexity synchronization between the power transmitter and the power receiver. The approach may in many scenarios allow an improved secondary power path to be provided from the power transmitter to the power receiver with this providing improved low power level transfer. In many embodiments, the approach may allow reduced complexity of the power receiver and may in in many cases remove the need for the power receiver to include functionality for extracting power from the power transfer signal for internal power receiver circuitry.

The approach may allow for increased power to be extracted from the communication carrier signal while still allowing efficient synchronization and communication.

The approach may further in many embodiments allow a more continuous extraction of power from the communication carrier signal resulting in reduced variations, e.g. reduced ripple caused by power extraction. This may further improve load modulation as this may be of a more stable communication carrier signal.

The use of a set of timing gaps that comprises a predetermined pattern of a plurality of timing gaps may allow improved operation and/or facilitate implementation and/or operation in many embodiments. It may in particular in many scenarios allow a more accurate detection of timing gaps and thus may improve synchronization operation leading to improved performance.

In many embodiments, a duration of the communication time interval is no more than 5%, 10%, or 20% of the duration of the time frame. In many embodiments, the duration of the power transfer time interval(s) is no less than 70%, 80%, or 90% of the duration of the repeating time frame. A combined/total duration of the timing gaps may in many embodiments not exceed 1%, 2%, 5%; or 10% of a duration of the power transfer time interval and/or of a duration of the repeating time frame.

Modulation of the communication carrier signal during the communication time intervals may be by load modulation of the carrier from the power receiver to the power transmitter and/or by amplitude modulation from the power transmitter to the power receiver. The communication may be NFC communication.

The timing gaps may also be referred to as synchronization time intervals, timing time intervals, or synchronization gaps.

The power transmitter may comprise a synchronizer for synchronizing timing of the set of timing gaps to the repeating time interval. Each time interval may have a fixed/predetermined/constant time offset to the repeating time frame (e.g. to the beginning and/or ending of this). The power transmitter may comprise a synchronizer for synchronizing a timing of the set of timing gaps to at least one of a timing of the power transfer time intervals and the communication time intervals.

The power transfer driver may be arranged to generate the power transfer drive signal, and thus the power transfer signal, to have a non-zero amplitude during the power transfer time intervals and to have a zero amplitude during communication time intervals.

The communication driver may be arranged to generate the communication drive signal, and thus the communication carrier signal, to have a non-zero amplitude except for during the timing gaps. The communication driver may be arranged to generate the communication drive signal, and thus the communication carrier signal, to have an amplitude variation of less than 10% of the average amplitude outside of the timing gaps. The communication driver may be arranged to generate the communication drive signal to have a zero amplitude during the timing gaps.

In accordance with an optional feature of the invention, the communication driver is arranged to generate the communication drive signal such that at least a first timing gap of the set of timing gaps has a fixed time offset to a timing of the power transfer time interval.

This may allow improved operation and/or facilitate implementation and/or operation in many embodiments.

In some embodiments, the communication driver may be arranged to generate the communication drive signal such that at least a first timing gap of the set of timing gaps has a fixed time offset to a timing of the communication time interval.

In some embodiments, the communication driver may be arranged to generate the communication drive signal such that at least a first timing gap of the set of timing gaps has a fixed time offset to a timing of the repeating time frame.

In accordance with an optional feature of the invention, the set of timing gaps are comprised in the power transfer time interval.

This may allow improved operation and/or facilitate implementation and/or operation in many embodiments.

In accordance with an optional feature of the invention, the predetermined pattern is a pattern of a plurality of timing gaps having a same duration and having a same time difference between consecutive timing gaps of the same repeating time frame.

This may allow improved operation and/or facilitate implementation and/or operation in many embodiments.

In accordance with an optional feature of the invention, the predetermined pattern is selected from a plurality of predetermined patterns.

This may allow improved operation and/or facilitate implementation and/or operation in many embodiments.

In accordance with an optional feature of the invention, the power transfer driver is arranged to be supplied by a time varying power supply signal and the communication driver is arranged to synchronize a timing of the set of timing gaps to the varying power supply signal.

This may allow improved operation and/or facilitate implementation and/or operation in many embodiments.

The time varying power supply signal may be generated from a mains supply, e.g. directly or by rectification of an AC mains signal. The repeating time frame may be synchronized to the time varying power supply signal/mains supply. The power transfer driver may be arranged to generate a time varying drive signal during the power transfer time intervals and the communication driver may be arranged to synchronize a timing of the set of timing gaps to the time varying drive signal.

In accordance with an optional feature of the invention, the communication driver is arranged to synchronize an end of a timing gap of the set of timing gaps to and end of the power transfer time interval.

This may allow improved operation and/or facilitate implementation and/or operation in many embodiments.

In accordance with an optional feature of the invention, the power transmitter is arranged to exchange a configuration message with the power receiver, the configuration message comprising an indication of a property of at least one timing gap of the plurality of timing gaps.

This may allow improved operation and/or facilitate implementation and/or operation in many embodiments. The configuration message may be an NDEF message of an NFC communication.

In accordance with an optional feature of the invention, the total combined duration of the timing gaps is no more than 5% of a duration of the power transfer time intervals.

According to an aspect of the invention there is provided a power receiver for wirelessly receiving power from a power transmitter via an electromagnetic power transfer signal, power transfer signal employing a repeating time frame comprising at least a power transfer time interval and a communication time interval, the power transfer signal being present during the power transfer time intervals and not present during communication time intervals, the power receiver comprising: an inductive power extraction element arranged to extract power from the power transfer signal during power transfer time intervals of a power transfer phase; a communication coil for receiving a received communication carrier signal, the communication carrier signal being present during communication time intervals and during the power transfer time intervals except for during a set of timing gaps during which no communication carrier signal is present, a total combined duration of the timing gaps being no more than 50% of a duration of the power transfer time intervals; a communication unit arranged to communicate with the power transmitter using modulation of the communication carrier signal during the communication time intervals; a synchronizer arranged to synchronize an operation of the power receiver to a timing of the set of timing gaps; wherein the set of timing gaps comprises a predetermined pattern of a plurality of timing gaps.

This may allow improved operation and/or facilitate implementation and/or operation in many embodiments. It may in many scenarios allow a lower complexity and/or lower cost power receiver to be provided. In many scenarios, the approach may reduce or even avoid the requirement for circuitry to extract power from the power transfer signal for internal power receiver functions.

According to an aspect of the invention there is provided a wireless power transfer system comprising a power transmitter and a power receiver as described above.

According to an aspect of the invention there is provided a method of operation for a power transmitter wirelessly providing power to a power receiver via an inductive power transfer signal, the method comprising: a power transfer coil generating the power transfer signal; generating a power transfer drive signal for the power transfer coil, the drive signal during a power transfer phase being generated to employ a repeating time frame comprising at least a power transfer time interval and a communication time interval, the power transfer drive signal being generated to be present during the power transfer time intervals but not during communication time intervals; a communication coil generating a communication carrier signal; generating a communication drive signal for the communication coil to generate the communication carrier signal; communicating with the power receiver using modulation of the communication carrier signal during communication time intervals; wherein the communication drive signal is generated to be present during communication time intervals and during the power transfer time intervals except for during a set of timing gaps during which no communication drive signal is generated, a total combined duration of the set of timing gaps being no more than 50% of a duration of the power transfer time intervals; wherein the set of timing gaps comprises a predetermined pattern of a plurality of timing gaps.

According to an aspect of the invention there is provided a method of operation for a power receiver wirelessly receiving power from a power transmitter via an electromagnetic power transfer signal, power transfer signal employing a repeating time frame comprising at least a power transfer time interval and a communication time interval, the power transfer signal being present during the power transfer time intervals and not present during communication time intervals, the power receiver comprising: extracting power from the power transfer signal during power transfer time intervals of a power transfer phase; a communication coil receiving a received communication carrier signal, the communication carrier signal being present during communication time intervals and during the power transfer time intervals except for during a set of timing gaps during which no communication carrier signal is present, a total combined duration of the timing gaps being no more than 50% of a duration of the power transfer time intervals; communicating with the power transmitter using modulation of the communication carrier signal during the communication time intervals; and synchronizing an operation of the power receiver to a timing of the set of timing gaps; wherein the set of timing gaps comprises a predetermined pattern of a plurality of timing gaps.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
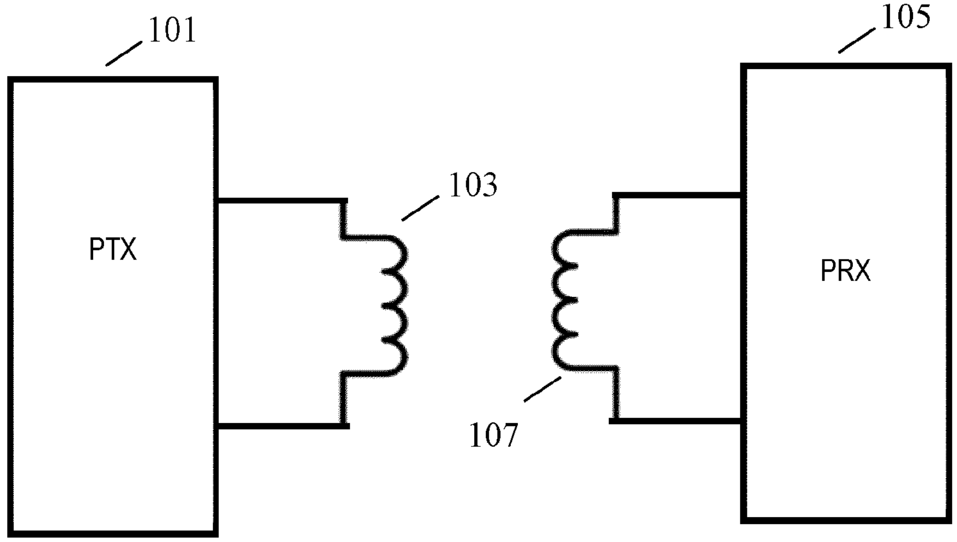
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may correspond to the electromagnetic power transfer component representing the energy transfer from the power transmitter to the power receiver, and may be considered to correspond to the component of the generated electromagnetic field that transfers power from the power transmitter to the power receiver. For example, if there is no loading of the receive coil 107, no power will be extracted by the power receiver from the generated electromagnetic field (apart from losses). In such a scenario, the driving of the transmitter coil 103 may generate an electromagnetic field of potentially high field strength but the power level of the power transfer signal will be zero (apart from losses). In some situations, where a foreign object is present, the power transfer signal may be considered to include a component corresponding to the power transfer to the foreign object, and thus the power transfer signal may be considered to correspond to the power being extracted from the electromagnetic field generated by the power transmitter.

The power transfer signal may typically have a frequency between around 20 kHz to around 500 kHz, and for Ki compatible systems typically in the range between 20 kHz to 80 kHz. The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element. The power receiver may accordingly provide a load to the power transfer signal by comprising an inductive power extraction element which specifically may be a power extraction coil or an electrical (e.g. heating) element in which current is induced by the power transfer signal.

The system is arranged to transfer substantial power levels, and specifically the power transmitter may support power levels in excess of 50 W, 100 W, 500 W, or 1 kW. For example, for Ki type applications, the power transfers may often be in excess of 100 W, and may be up to more than 2500 W for very high power applications.

In the following, the operation of the power transmitter 101 and the power receiver 105 will be described with specific reference to an embodiment generally in accordance with the Specifications (except for the herein described (or consequential) modifications and enhancements) being developed by the Wireless Power Consortium. In particular, the power transmitter 101 and the power receiver 105 may follow, or substantially be compatible with, elements of the Ki Standards.

Many wireless power transfer systems, and in particular high power systems such as Ki, utilize resonant power transfer where the transmitter coil 103 is part of a resonance circuit and typically the receiver coil 107 is also part of a resonance circuit. In many embodiments, the resonance circuits may be series resonance circuits and thus the transmitter coil 103 and the receiver coil 107 may be coupled in series with a corresponding resonance capacitor. The use of resonance circuits tends to provide a more efficient power transfer.

Figure 2:
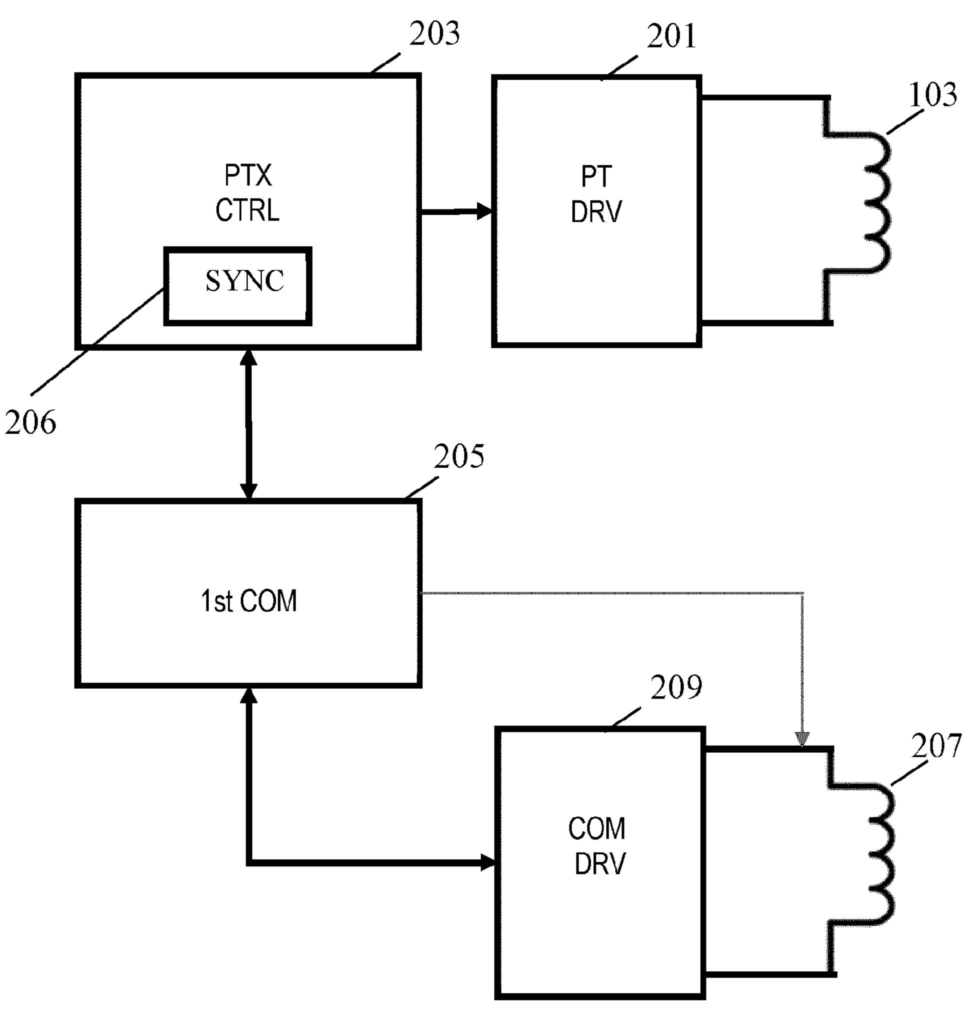
FIG. 2 illustrates an example of elements of a power transmitter in accordance with some embodiments of the invention.
Figure 3:
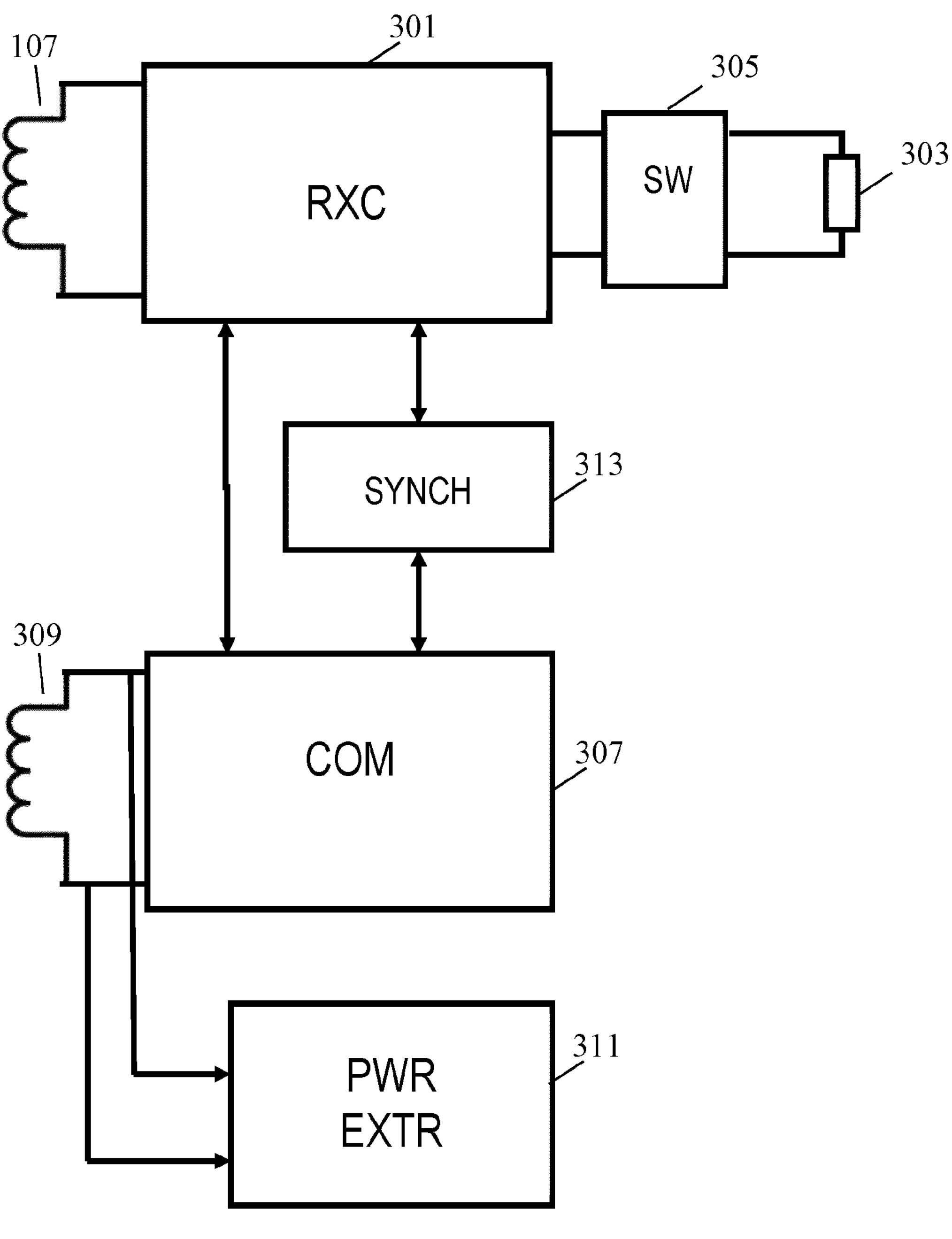
FIG. 3 illustrates an example of elements of a power receiver in accordance with some embodiments of the invention.

FIG. 2 illustrates elements of the power transmitter 101 and FIG. 3 illustrates elements of the power receiver 105 of FIG. 1 in more detail.

The power transmitter 101 includes a driver 201 which can generate a drive signal that is fed to the transmitter coil 103 which in return generates the electromagnetic power transfer signal, which provides a power transfer to the power receiver 105. The power transfer signal is provided (at least) during power transfer time intervals of the power transfer phase.

The driver 201 may typically comprise an output circuit in the form of an inverter, typically formed by driving a full or half bridge as will be well known to the skilled person.

The power transmitter 101 further comprises a power transmitter controller 203 which is arranged to control the operation of the power transmitter 101 in accordance with the desired operating principles. Specifically, the power transmitter 101 may include many of the functionalities required to perform power control in accordance with the Qi Specifications.

The power transmitter controller 203 is in particular arranged to control the generation of the drive signal by the driver 201, and it can specifically control the power level of the drive signal, and accordingly the level of the generated power transfer signal. The power transmitter controller 203 comprises a power loop controller controlling a power level of the power transfer signal in response to the power control messages received from the power receiver 105 during the power control phase.

In order to receive data and messages from the power receiver 105, the power transmitter 101 comprises a first communicator 205 which is arranged to receive data and messages from the power receiver 105 as well as transmit data and messages to the power receiver 105 (as will be appreciated by the skilled person, a data message may provide one or more bits of information).

In the approach, the communication is performed by modulation of a communication carrier signal that is generated by a first communication coil 207. The power transmitter specifically comprises a communication driver 209 which is coupled to the first communication coil 207. The communication driver 209 is arranged to generate a communication drive signal which is fed to the first communication coil 207 to generate the communication carrier signal. The communication driver 209 may typically be arranged to generate the communication drive signal/communication carrier signal to have a substantially different frequency that the power transfer drive signal/power transfer signal. In many embodiments, the frequency of the communication carrier signal may be no less than 10, 100, or 500 times higher than the frequency of the power transfer signal. In many embodiments, the frequency of the communication drive signal/communication carrier signal may have a frequency of no less than 500 kHz, 1 MHz, or 10 MHz. Specifically for an NFC implementation, the communication carrier signal frequency may be 13.56 MHz.

The first communicator 205 is coupled to the communication driver 209 and is arranged to control this to modulate the communication drive signal/communication carrier signal in order to transmit data to the power receiver (in the following references to the communication drive signal also include the implicit reference to the communication carrier signal as appropriate).

The modulation is in the specific example an amplitude modulation of the communication drive signal, and specifically a binary communication using Amplitude Shift Keying (ASK) is used. However, it will be appreciated that in other embodiments, the modulation may use other approaches, such as phase or frequency modulation of the communication drive signal.

In some embodiments, the first communicator 205 may for example receive data to be transmitted to the power receiver from the power transmitter controller 203 and in response generate a control modulation signal that is fed to the communication driver 209. The control modulation signal may for example be a binary signal that matches the data to be transmitted and the communication driver 209 may be arranged to generate the communication drive signal to have corresponding amplitude variations.

For communication from the power receiver to the power transmitter, the modulation of the communication drive signal may be a load modulation. The power receiver may be arranged to modulate the power transfer signal by varying a loading of the power transfer signal generated by the transmitter coil 103 in accordance with the data to be transmitted. The first communicator 205 may be arranged to sense variations in the voltage and/or current of the transmitter coil 103 and to demodulate the load modulation based on these. The skilled person will be aware of the principles of load modulation and therefore these will not be described in further detail.

In many embodiments, the communication may be in accordance with the Near Field Communication, NFC, Specifications and the power receiver may specifically include NFC functionality. In many embodiments, the first communicator 205, communication driver 209, and first communication coil 207 may implement (at least) the functionality of an NFC reader. Thus, in many embodiments, the communication drive signal/communication carrier signal is a constant level (except for modulation) 13.56 MHz signal.

The following description will focus on examples where the communication between the power transmitter and power receiver is by NFC communication and specifically where modulation of the NFC carrier in the direction from the power transmitter to the power receiver is by Amplitude Shift Keying (ASK) and modulation of the NFC carrier in the direction from the power receiver to the power transmitter is by load modulation.

In the system of FIGS. 1-3, the communication is during the power transfer phase performed in communication time intervals. Specifically, the transmitter controller 203 may comprise/implement a synchronizer 206 which is arranged to synchronize the first communicator 205 such that the communication operation (typically both receiving and transmitting data) is performed in (and typically only in) the communication time intervals of the power transfer phase, i.e. in the time intervals that are assigned for communication.

This may substantially improve communication performance.

As will be described in more detail in the following, the approach utilizes a time division approach during the power transfer phase wherein operations, such as foreign object detection and communication, and power transfer may e.g. be performed in different time intervals thereby allowing the interference between these (specifically the impact of the power transfer on the foreign object detection/communication) to be reduced substantially.

Specifically, for the wireless power transfer system, the power transfer signal is subject to a repeating time frame which comprises at least one power transfer time interval and one communication time interval.

The power transmitter may be arranged to switch off the power transfer signal during the communication time interval and the power receiver may in some embodiments be arranged to disconnect the load during the reduced power time interval.

The power transmitter (and typically the power receiver) may then arrange for one or more operations (functions, processes, procedures) to be performed during the communication time interval, i.e. it may synchronize the execution of one or more operations of the power transmitter to occur during the communication interval. For example, it may typically synchronize the performance of the foreign object detection and communication to occur during the communication time interval. In this way, it can be achieved that the impact of the power transfer and the power transfer signal on the given operation, specifically the foreign object detection and the communication, can be reduced and often minimized.

FIG. 3 illustrates some exemplary elements of the power receiver 105.

The receiver coil 107 is coupled to a power receiver controller 301 which couples the receiver coil 107 to a load 303 via a switch 305 (i.e. it is a switchable load 305). The power receiver controller 301 includes a power control path which converts the power extracted by the receiver coil 107 into a suitable supply for the load 303. In addition, the power receiver controller 301 may include various power receiver controller functionality required to perform power transfer, and in particular functions required to perform power transfer in accordance with the Qi specifications.

In order to support communication from the power receiver 105 to the power transmitter 101 the power receiver 105 comprises a second communicator 307 and a second communication coil 309. The second communication coil 309 is arranged to couple to the first communication coil 207 and thus the communication carrier signal induces a current (at least an emf) in the second communication coil 309.

The second communicator 307 is coupled to the second communication coil 309 and is arranged to determine amplitude variations in the induced signal and to demodulate amplitude modulations of the communication carrier signal. Thus, the second communicator 307 is arranged to decode data transmitted from the power transmitter by amplitude modulation of the communication carrier signal. It will be appreciated that in other embodiments, the second communicator 307 may be arranged to decode data modulated onto the communication carrier signal using other modulation formats such as frequency or phase modulation.

The second communicator 307 is further arranged to load modulate the communication carrier signal in order to transmit data from the power receiver to the power transmitter. Specifically, the second communicator 307 may comprise a load (such as a capacitor) which depending on the data to transmit can be switched between being coupled to the second communication coil 309 and not being coupled to the second communication coil 309. These load modulations may then be detected by the first communicator 205 of the power transmitter.

In the specific example, the second communication coil 309 and the second communicator 307 may provide NFC compatible communication operation. Specifically, the second communication coil 309 may be arranged to provide functionality corresponding to an NFC tag and to decode data that has been ASK modulated onto the communication carrier signal in accordance with the NFC specifications.

Thus, the second communicator 307 is arranged to transmit data to the power transmitter by varying the loading of the receiver coil 107 in response to data to be transmitted to the power transmitter 101. The load variations are then detected and demodulated by the power transmitter 101 as will be known to the person skilled in the art.

In the example, the second communicator 307 is furthermore arranged to demodulate amplitude, frequency, and/or phase modulation of the communication carrier signal in order to retrieve data transmitted from the power transmitter.

Figure 4:
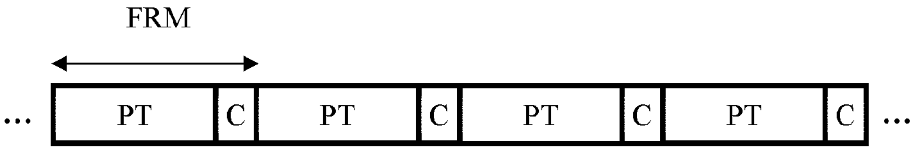
FIG. 4 illustrates an example of a time frame for a wireless power transfer system in accordance with some embodiments of the invention.

The system applies a repeating time frame during the power transfer phase where the time frame comprises at least one power transfer time interval and at least one communication time interval. An example of such a repeating time frame is illustrated in FIG. 4 where power transfer time intervals are indicated by PT and communication time intervals are indicated by C. In the example, each time frame FRM comprises only one communication time interval and one power transfer time interval. However, it will be appreciated that in other embodiments, other time intervals may also be included in a time frame or a plurality of communication time intervals and/or power transfer time intervals may be included in each time frame.

The power transfer driver 201 is controlled by the power transmitter controller 205 to only generate a drive signal during the power transfer time intervals and not during the communication time intervals. Thus, the driver generates the drive signal and thus the power transfer signal during the power transfer time intervals, whereas the drive signal and thus the power transfer signal is switched off during the communication time intervals.

In the power transfer phase, the power transmitter is thus arranged to perform power transfer during the power transfer time interval of the time frames of the power transfer phase. Specifically, during these time intervals, the power transmitter and the power receiver may operate a power control loop (the power control loop may be based on communication within communication time intervals corresponding to repeating time intervals). Thus, the level of the power being transferred may be dynamically varied.

In the communication time intervals of the time frames of the power transfer phase, the power drive signal is however switched off and thus no power transfer signal is generated during the communication time intervals.

The communication between the power transmitter and the power receiver is during the power transfer phase performed in the communication time intervals, and typically is only performed in the communication time intervals. The communication via the first communication coil 207 and the second communication coil 309 is only performed in the communication time intervals and specifically the modulation of the communication carrier signal occurs only in the communication time intervals.

In the system, the first communicator 205 is accordingly arranged to only transmit data, and thus to only (e.g. amplitude) modulate the communication carrier signal, during the communication time intervals. Likewise, it will typically only seek to demodulate data during the communication time intervals.

Similarly, the second communicator 307 is arranged to only communicate during communication time intervals when in the power transfer phase. In the system, the second communicator 307 is accordingly arranged to only transmit data, and thus to only load modulate the communication carrier signal, during the communication time intervals. Likewise, it will typically only seek to demodulate data during the communication time intervals.

Thus, during the power transfer phase, the first communicator 205 and the second communicator 307 are arranged to only communicate during the communication time intervals. Such an approach may provide highly advantageous performance and in particular has been found to provide much improved communication performance. In particular, the approach reduces interference to the communication operation from the power transfer signal thereby providing a more reliable and robust communication with reduced bit errors.

Figure 5:
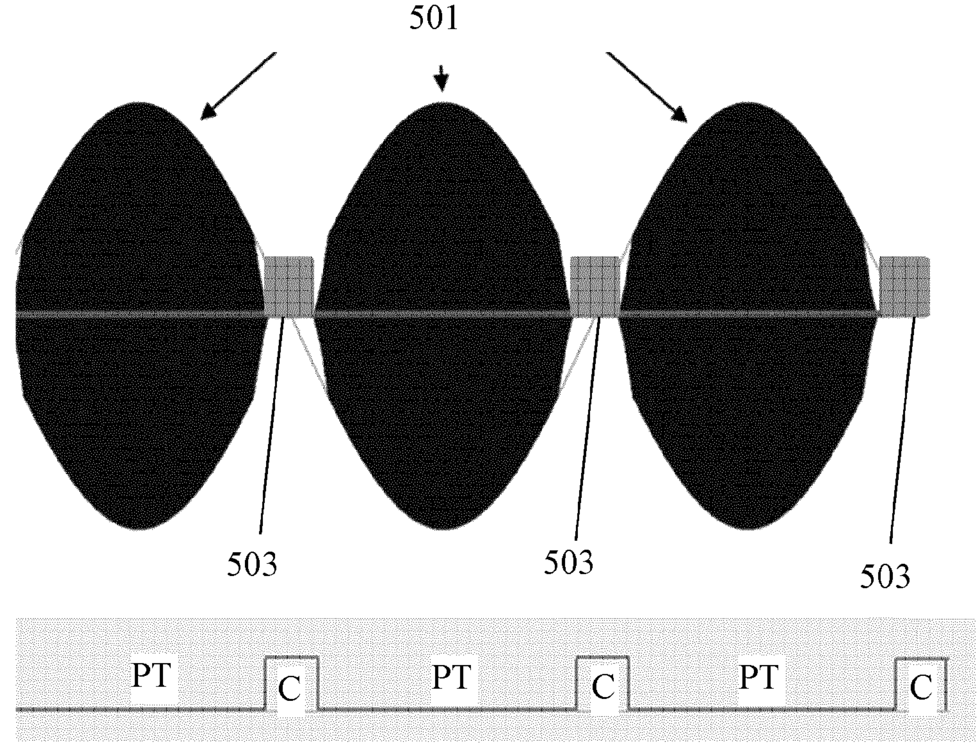
FIG. 5 illustrates an example of a power transfer signal and a communication carrier signal in a wireless power transfer system.

An example of how communication in communication time intervals of a repeating time frame could be performed is shown in FIG. 5 which shows the power transfer signal 501 being generated during the power transfer time intervals PT and the modulated communication carrier signal 503 being generated during the communication time intervals C. FIG. 5 implements the time division between power transfer and communication with each operation being performed in the dedicated time interval.

However, in the approach of the system of FIGS. 1-4, a more flexible and overlapping approach is applied. Indeed, in the approach the power transmitter is arranged to generate the communication carrier signal to be present during the power transfer time intervals and thus it is co-present while the power transfer signal is generated during the power transfer time interval. However, the communication carrier signal is not generated to be continuously present but rather one or more timing gaps are inserted in the time frame during which no communication drive signal and communication carrier signal is generated. Thus, typically relatively short gaps are inserted into the generation of the communication carrier signal. Further, in the approach, the modulation of the communication carrier signal is controlled differently than the generation of the communication carrier signal, and specifically the modulation is controlled to only occur during the communication time intervals. Thus, the communication drive signal and communication carrier signal generated during the power transfer time intervals are unmodulated.

Figure 6:
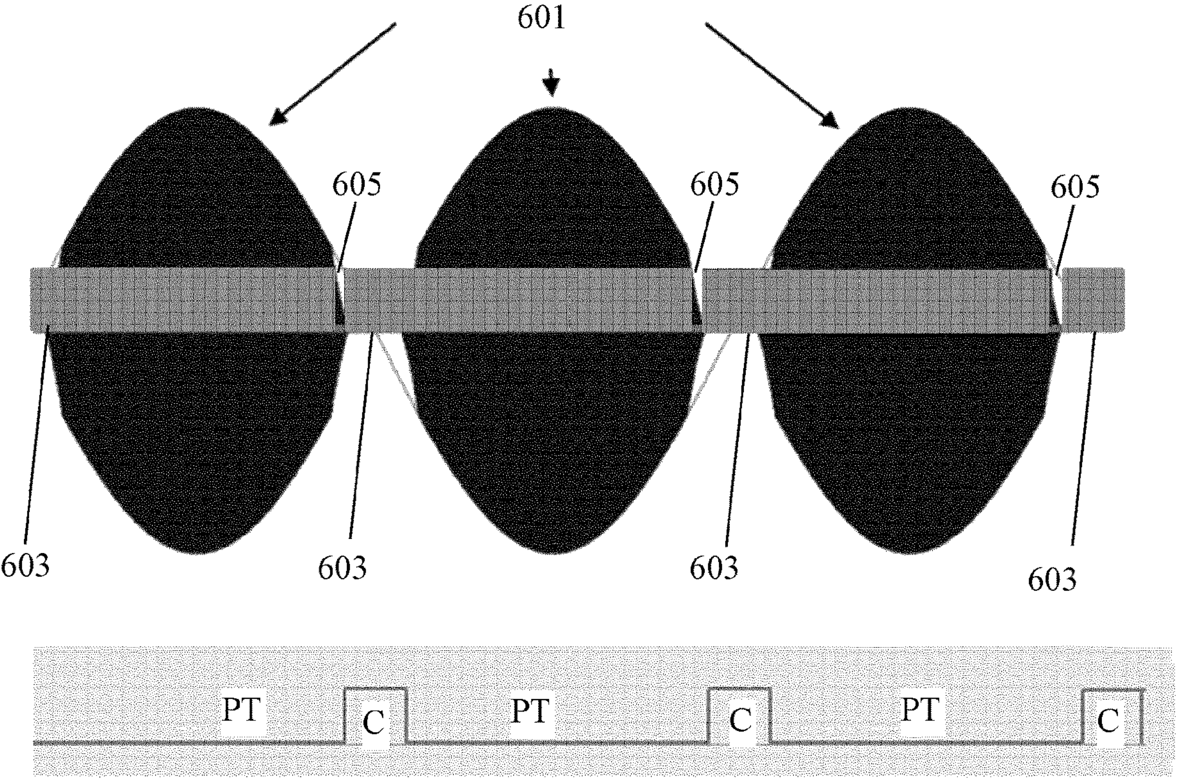
FIG. 6 illustrates an example of a power transfer signal and a communication carrier signal in a wireless power transfer system in accordance with some embodiments of the invention.

FIG. 6 illustrates an example of an approach that may be used by the system of FIGS. 1-4. In the example, the power transfer signal 601 as for FIG. 5 but the communication carrier signal 603 is generated throughout the repeating time frames except for a short timing gap in each time frame during which the communication carrier signal 603 is switched off.

The approach may in particular be used to provide a second low level power transfer path from the power transmitter to the power receiver. In particular, the power receiver comprises a power extractor 311 which is arranged to extract power from the communication carrier signal when this is present. In the specific example, the power extractor 311 may accordingly extract power from the NFC carrier signal.

Thus, power may be provided from the power transmitter to the power receiver via communication carrier signal/NFC carrier power harvesting. This may provide power to low power level, and e.g. low voltage, electronics, such as the NFC hardware or a user interface.

Figure 7:
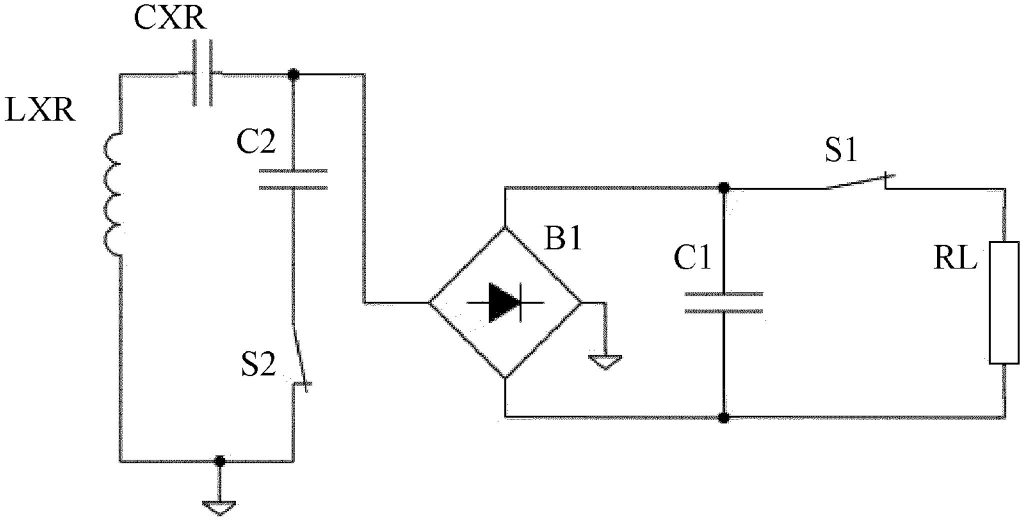
FIG. 7 illustrates an example of elements of a power transfer path for a wireless power transfer operation.
Figure 8:
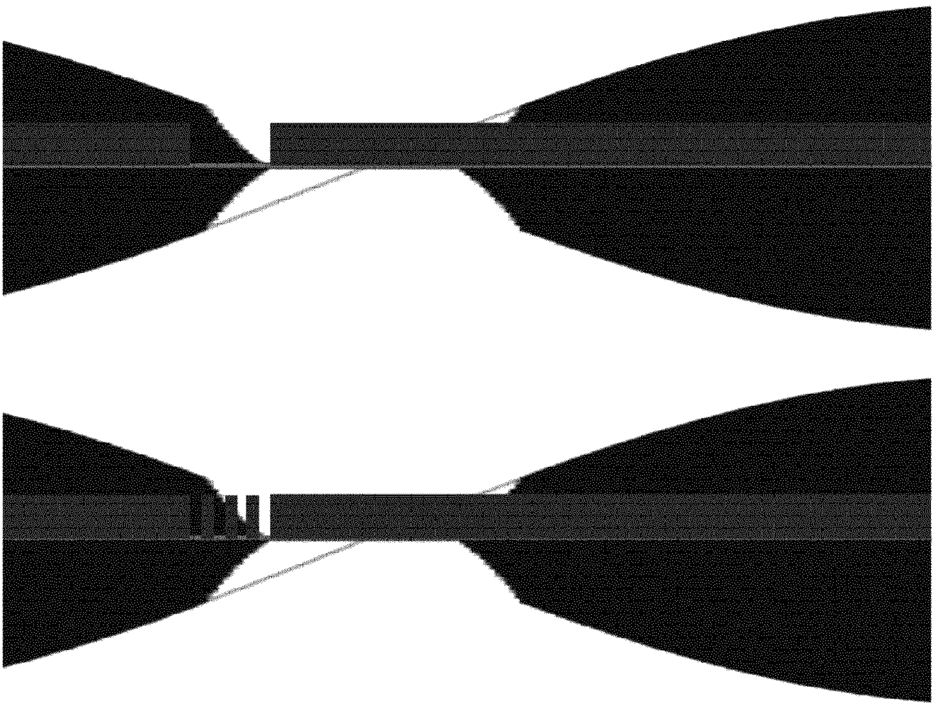
FIG. 8 illustrates an example of a power transfer signal and a communication carrier signal in a wireless power transfer system in accordance with some embodiments of the invention.

The power extractor 311 may be relatively simple and an example of power extracting circuitry/power path is illustrated in FIG. 7.

FIG. 7 illustrates a circuit diagram of elements of an example of a power path of the power extractor 311. In the example, the second communication coil 309 is referred to by the designation LRX and when this is subjected to the communication carrier signal a corresponding AC voltage/current is induced in the coil. The second communication coil 309 is coupled to series capacitor CRX which together forms an input resonance circuit that is further coupled a rectifier bridge B1 with a smoothing capacitor C1 coupled to the output of the bridge. Thus, a DC voltage is generated over the capacitor C1. The magnitude of the ripple on the DC voltage will depend on the size of the smoothing capacitor as well as on the load RL supplied by the power extractor 311. The use of an input resonance circuit formed by LRX and CRX provides a more efficient power transfer coupling. The inclusion of CRX makes the circuit resonant on the communication carrier frequency and therefore power harvesting works mainly at the communication frequency.

The bridge B1 and smoothing capacitor C1 are coupled to a load RL via a switch S1 which can be used to switch on and off the power extraction/harvesting. It will be appreciated that in many embodiments, the power extractor 311 may be directly and permanently coupled to the load RL with no switch being present.

FIG. 7 further illustrates a load modulation capacitor C2 which can be connected or disconnected in parallel to the second communication coil 309 based on the switching of switch S2. The second communicator 307 may during the communication time intervals control the switch S2 to provide the desired load modulation.

Thus, the power extractor 311 may be implemented by a low complexity and low cost circuit.

The power extraction is supported by the extended duration of the communication carrier signal and by this being generated and produced even during the power transfer time intervals. Indeed, in many embodiments, the timing gaps in which the communication carrier signal is not generated may be very short and substantially insignificant thereby allowing power extraction to be performed almost constantly. This may provide a substantially increased extracted power. For example, for an NFC implementation, the extracted power may typically be up to around 200 mW whereas using an approach such as that of FIG. 5 with communication time intervals of typically around 1.5 msec for every 10 msec time frame will allow only 30 mW to be extracted. Further, a more stable output voltage with substantially reduced ripple can be achieved as the smoothing capacitor need only support power for short timing gaps rather than for the majority of the time frame. Typically, this may allow a much smaller capacitor to be used which may reduce cost and reliability significantly as capacitors not only tend to be relative expensive but also tends to be more unreliable and more error prone than most electronic components.

The ability to extract increased power from the communication carrier signal may be very significant in many scenarios and may allow substantial design flexibility. For example, many electronic circuits, including low performance processing circuits (e.g. including a microcontroller) can be designed with a power consumption of less than 200 mW whereas designing such circuits with a power consumption of less than 30 mW is often very difficult or impossible. The increased power level may very substantially reduce complexity and price in many practical applications. Indeed, if more power is required than by a given approach can be extracted from the communication carrier signal, an additional power supply needs to be implemented to draw power from the high voltage power transfer system, i.e. from the power transfer signal. This could for example be a capacitive supply requiring high voltage capacitors or a specific type of buck-converter suitable for high voltage inputs. This usually requires much more expensive and bulkier components than those needed for an approach such as that described for the power extractor 311.

The approach may also allow improved load modulation by reducing ripple. In the example of FIG. 7, the extended communication carrier signal results in the voltage over C1 voltage having less ripple. As a consequence the load modulation introduced by C2 will be for a more constant situation with less variation resulting in improved load modulation communication. In particular, variations caused by C2 are easier to detect by the power transmitter as other variations are reduced.

The approach may thus for many practical applications allow a substantially reduced complexity and cost. For example, a power receiving device that includes a heating element as a load may directly be supplied by a power transfer signal directly inducting currents in the heating element. Indeed, in such an example, the described approach may in many cases allow a control and support circuitry as well as a user interface to be implemented and fully powered from the communication carrier signal, and specifically from an NFC carrier. Thus, the approach can in some cases allow a power receiving device to be designed that includes no electronic circuit powered by the power transfer signal. Thus, complex high voltage power extraction circuitry can be avoided completely. This would typically not be possible if e.g. only 30 mW of supply power is available.

However, rather than generating a continuous power transfer signal during the entire time frame, the system applies one or more timing gaps in the time frame during which no communication drive signal and communication carrier signal is generated (henceforth these will for brevity simply be referred to as timing gaps). In the example of FIG. 6, a short timing gap 605 is introduced at the end of each power transfer time interval and immediately before the communication time intervals starts.

These timing gaps are used to provide timing information to the power receiver from the power transmitter. Specifically, the timing gaps may be introduced to start and/or stop at specific and/or predetermined time instants within each time frame.

The power receiver of FIG. 3 accordingly comprises a synchronizer 313 to synchronize an operation of the power receiver to the timing of the timing gap(s). The synchronizer 313 may specifically adapt a time of a local time base in response to the timing of the timing gap(s), and the operations of the power receiver may be timed according to the local time base.

Operations that can be synchronized to the timing of the timing gaps may include any suitable time operations of the power receiver. In particular, the synchronizer 313 may synchronize the timing of the locally applied repeating time frame, i.e. it may synchronize the application and operation of the functions timed to the repeating time frame. The synchronizer 313 may specifically synchronize the operations of the communication time intervals and power transfer time intervals to the timing gaps. As a specific example, the modulation and/or demodulation of the communication carrier signal by the second communicator 307 may be synchronized to/based on the timing of the timing gaps.

The timing gaps of the communication carrier signal accordingly allows the power transmitter and the power receiver operations to be closely aligned and synchronized, and in particular allows power receiver operations to be aligned and synchronized to the repeating time frame employed by the power transfer signal as generated by the power transfer driver.

Typically, all repeating time frames are identical and have the same time intervals with these having the same duration and order in each time frame.

The repeating time frame may in many embodiments have a duration of between 5 and 25 msecs, and specifically may in many embodiments be 10 ms or 20 ms (for a 50 Hz mains supplied power transmitter) or 8.3 ms or 16.7 ms (for a 60 Hz mains supplied power transmitter).

The duration of the power transfer time intervals is typically no less than 60% or 80% of the repeating time frame. In many embodiments, the duration of the power transfer time interval may be in the range from 3-20 msec, and specifically between 5-9.5 msec. In many embodiments, the duration of the power transfer time interval may be in the range of 7-9 msec, and specifically may be approximately be 8.5 msec.

The duration of the communication time intervals is typically substantially less than the power transfer time intervals and may typically be no more than 20% or 30% of the duration of the power transfer time intervals. The duration of the communication time intervals may typically be in the range of 1-2 msec.

The duration of the timing gaps may depend on the specific preferences and requirements of the individual embodiment. However, the communication carrier signal is generated to extend substantially into the power transfer time intervals and specifically the total combined duration of the set of timing gaps is no more than 50% of a duration of the power transfer time intervals. Thus, the communication carrier signal is generated for at least 50% of the power transfer time intervals. In many embodiments, the combined duration of the timing gaps is substantially less, and indeed in many embodiments the combined total duration of the set of timing gaps is not more than 20%, 10%, 5%, 2%, or even 1% of the duration of the power transfer time intervals and/or the repeating time frame.

The duration of the timing gaps is thus kept relatively short thereby allowing an increased power level to be extracted. At the same time, the timing gaps may be kept sufficiently long to be detectable by the synchronizer 313 to allow accurate timing determination. In many embodiments, each timing gap may be no less than 0.1%, 0.5%, 1%, 2%, or 5% of the duration of the timing frame. In many embodiments, the duration of a timing gap may be in the range from 0.1 msec-5 msec, and specifically in the range from 0.2 msec-1 msec.

The specific generation of the communication drive signal and the communication carrier signal is accordingly in the examples such that the signals may provide multiple features in addition to main purpose of the communication for which it is provided. In particular, the approach may advantageously generate a communication carrier signal that does not only provide a communication means/carrier but which also allows an efficient low level power transfer path and which provides timing/synchronization information from the power transmitter to the power receiver.

Accordingly, a highly efficient operation can be achieved that not only may provide highly advantageous performance, but which may also e.g. reduce the complexity and cost of the circuitry required at the power receiver.

The approach may be particularly advantageous for embodiments wherein the communication carrier signal is an NFC carrier. In such embodiments, the power transmitter may implement an NFC reader function. In such an approach, the NFC is the master and in control of the communication with the power receiver listening and responding if necessary. The power receiver is therefore not aware of timing of the communication. However, the described approach may advantageously and efficiently provide a timing synchronization approach.

Another advantage of continuously supplying functionality by power extracted from an NFC carrier is that such power can be very consistent independent of the power delivered to the main load by the inductive power transfer. For example, a Ki power receiver covers a wide range of power levels. E.g. a blender can require between 25 W and 1.5 kW depending on how it is used, and therefore the main power supply needs to be able to work with this large input range, providing enough power to the low voltage circuitry at all times. This is especially of importance at very low powers where phase cutting/discontinuous mode is used, and power is only being transferred during a portion of the mains period.

In many embodiments, the power driver 201 may be supplied by a time varying supply signal. In particular, the supply voltage to the output stage may be generated from an AC voltage, such as specifically from an AC mains voltage. The AC voltage may in some embodiments directly be used as a supply voltage to the output circuit (e.g. inverter) of the power driver 201. In many embodiments, the supply voltage may alternatively be generated as a rectified mains voltage. Thus, in many embodiments, the (absolute) supply voltage varies as a (possibly rectified) sine wave with a given period. As a result, the generated power transfer drive signal has a (sine wave) time varying amplitude as also shown in FIGS. 5 and 6. The amplitude has minimums (typically zero value) corresponding to the zero crossings of the input supply voltage and specifically to the main. Thus, the power transfer drive signal/power transfer signal is generated to have a period of the amplitude of half the period of the AC mains signal.

In such embodiments, the repeating time frame, and accordingly the power transfer time interval and communication time intervals, may be synchronized to the varying power supply signal and thus to the timing of the amplitude variations of the power transfer drive signal. In particular, the communication time intervals may be arranged to be at (include) the minimums of the amplitude (corresponding to the zero crossings of the mains signal).

Likewise, the communication driver 209 is arranged to generate the communication drive signal and thus the communication carrier signal such that the timing gaps are also synchronized to the varying power supply signal.

Thus, in many embodiments, the repeating time frame, the power transfer time intervals, the communication time intervals, and the timing gaps are (specifically in the power transmitter) synchronized to the time varying power supply signal, and specifically to the mains supply.

The timing gaps may be arranged to be at different positions of the time frame in different embodiments.

In many embodiments, a timing gap may be included to indicate a transition from a power transfer time interval to a communication time interval. E.g., in the example of FIG. 6, a timing gap is positioned at the end of the power transfer time interval, and thus when the communication time interval is about to begin. Such a timing gap may facilitate synchronization of the repeating time frame at the receiver and particularly may allow a low complexity adaptation of the timing of operations relating to the communication time intervals and power transfer time intervals. In particular, it may allow an improved and/or simplified adaptation of the timing of the communication operation. The synchronizer 313 may for example simply detect the timing gap and switch to the communication time interval operation when the end of the timing gap is detected. Specifically, modulation and demodulation may be performed immediately after an end of the timing gap is detected.

In some embodiments, the power transmitter may alternatively or additionally add a timing gap at the start of a power transfer time interval. For example, just before the power transfer signal is switched on by the power transfer driver 201 generating the power transfer drive signal, the communication driver 209 may be controlled to insert a gap in the generated communication carrier signal such that this ends when the power transfer signal is switched on. Such a gap may for example by the synchronizer 313 of the power receiver be used to e.g. switch on a load, to terminate any modulation of the communication carrier signal, stop demodulation of the communication carrier signal etc.

As another example of an operation or process that may be synchronized by the timing of such timing gaps is e.g. measurement of true RMS power by measuring the power during a complete repeating time frame which may correspond to a mains period, and calculating the RMS power from the measured values. To perform such a measurement, it is important that an entire mains period is measured and thus the measurement should start right at the start of the mains period and end exactly at the end. This period may in some embodiments be represented by the interval between two timing gaps.

In some embodiments, a timing gap may for example alternatively or additionally be positioned at other times in the repeating time frame and specifically within the power transfer time interval. For example, a timing gap may be inserted at the maximum amplitude level of the power transfer signal thereby allowing accurate measurement of this level at the power receiver simply by timing measurements to this timing gap. Such measurements may for example be useful as indications of the power transfer (e.g. to a heating element or motor).

In many embodiments, one or more of the timing gaps are comprised in the power transfer time interval, and indeed in many embodiments, timing gaps are only introduced during the power transfer time intervals. In many embodiments, no timing gaps are included in the communication time intervals.

Such an approach may often provide improved performance as the impact of timing gaps may be reduced. For example, it may avoid communication to be interrupted by no communication carrier signal being available for modulation. It may also in many scenarios allow a lower complexity and facilitated synchronizer 313 at the power receiver side (such as e.g. allowing a function to be triggered simply by a detection of a beginning or ending of a timing gap as in the previously provided examples).

However, it will be appreciated that in some embodiments one, more, or all of the timing gaps may be outside of the power transfer time intervals, and indeed may be during a communication time interval. For example, rather than a timing gap being positioned at the very end of a power transfer time interval, it may be provided at the beginning of the communication time interval. For example, the start of the timing gap may occur at the same time the power transfer signal is switched off and the end of the timing gap may be after e.g. a fixed duration of the timing gap. The synchronizer 313 may in such a case control the modulation/demodulation to begin at the end of the timing gap.

Each repeating time frame could comprise only a single timing gap. This may for example allow lower complexity operation and/or minimize the interruptions to the communication carrier signal.

However, in the approach, the timing gaps may comprise a set pattern of a plurality of timing gaps. The pattern of timing gaps may specifically be a predetermined pattern. The pattern may be given/characterized by the duration of the timing gaps and the delay/time offset between timing gaps.

In many embodiments, the duration of each timing gap may be the same, but it will be appreciated that in some embodiments, timing gaps may have different durations. Similarly, the time offset between adjacent timing gaps may typically be the same but may in some embodiments be different.

In some embodiments, a predetermined pattern may be a set of timing gaps that have the same duration and for which the time offset/delay/duration between consecutive timing gaps of the same repeating time frame are the same. FIG. 7 illustrates an example of such an approach where a pattern consisting of four short equidistant timing gaps with the same duration are used.

The use of such patterns may improve operation in many cases. It may typically provide improved detection of the timing gaps thereby allowing more accurate synchronization. Indeed, the use of a pattern rather than a single timing gap may provide the advantage of improved detectability. In many embodiments, there may be multiple mechanisms that could generate gaps in an NFC carrier, such as communication errors, transitions between connected mode and power mode, Foreign Object Detection (FOD) measurements, etc. This may in some embodiments make it difficult for a power receiver to properly differentiate between timing gaps and other gaps that may result from other factors such as those indicated above. A pattern that is highly unlikely or even impossible to occur from other evens may enable a more accurate and reliable detection and thus synchronization.

In some embodiments, the pattern may be a pattern that is selected from a plurality of predetermined patterns. This may for example allow identification of the power transmitter and may allow co-existence between different power transmitters.

For example, a power transmitter arrangement may include a plurality of transmitter coils that are positioned relatively close to each other. For example, a worksurface may have a plurality of power transfer positions that can be used by power receiving devices. However, this may result in a number of communication carrier signals being generated in close proximity to each other. In some embodiments, different patterns of timing gaps may be used for the different transmitter coils. This may reduce interference and allow improved synchronization, and thus may provide improved interoperability between different transmitter coils/power transmitters that are arranged close to each other.

In many embodiments, the power transmitter and power receiver may be arranged to adapt a property of one or more timing gaps based on a communication exchange between the power transmitter and the power receiver. In particular, a configuration message may be transmitted from the power receiver with a request or indication of a property of the timing gaps. The configuration message may e.g. comprise a direct or indirect request for a property for at least one timing gap of the plurality of timing gaps. Alternatively or additionally, the configuration message may provide information of a configuration of the power receiver. The configuration message may e.g. be part of a negotiation approach performed during an initialization of the power transfer (such as during a connected phase for a Ki power receiver and wireless power transfer system). The power transmitter may then proceed to adapt a property of the timing gaps in response to the configuration message. For example, the power receiver may request a specific timing gap pattern, or a timing gap duration, and the power transmitter may proceed to set the value accordingly.

In some embodiments, a configuration message may indicate whether the power receiver can support the described operation or not (e.g. a power receiver capable of supporting the operation may be arranged to transmit a message indicating that it does have such capability. This indication may be directly related to this operation or may be more general, such as by indicating a version of the specifications that the power receiver is compatible with). In such cases, the power transmitter may be arranged to only use the described operation, and specifically timing gaps, if the power receiver indicates that it can support the operation.

For an NFC implementation, the configuration message may specifically be an NDEF (NFC Data Exchange Format) message.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

It will be appreciated that the reference to a preferred value does not imply any limitation beyond it being the value determined in the foreign object detection initialization mode, i.e. it is preferred by virtue of it being determined in the adaptation process. The references to a preferred value could be substituted for references to e.g. a first value.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

Generally, examples of a power transmitter and method of operation therefor, a power receiver and method of operation therefor, and a wireless power transmitter are indicated by below embodiments.

EMBODIMENTS

Embodiment 1. A power transmitter (101) for wirelessly providing power to a power receiver (105) via an inductive power transfer signal, the power transmitter (101) comprising:

- a power transfer coil (103) arranged to generate the power transfer signal;
- a power transfer driver (201) arranged to generate a power transfer drive signal for the power transfer coil (103), the power transfer driver (201) being arranged to, during a power transfer phase, generate the power transfer drive signal to employ a repeating time frame comprising at least a power transfer time interval and a communication time interval, the power transfer driver (201) being arranged to generate the power transfer drive signal during the power transfer time intervals and to not generate the power transfer drive signal during communication time intervals;

a communication coil (207) arranged to generate a communication carrier signal, a communication driver (209) arranged to generate a communication drive signal for the communication coil to generate the communication carrier signal;

a communication unit (205) arranged to communicate with the power receiver (105) using modulation of the communication carrier signal during communication time intervals;

wherein the communication driver (205) is arranged to generate the communication drive signal to be present during communication time intervals and during the power transfer time intervals except for during a set of timing gaps during which no communication drive signal is generated, a total combined duration of the set of timing gaps being no more than 50% of a duration of the power transfer time intervals.

Embodiment 2. The power transmitter (101) of any previous embodiment wherein the communication driver (205) is arranged to generate the communication drive signal such that at least a first timing gap of the set of timing gaps has a fixed time offset to a timing of the power transfer time interval.

Embodiment 3. The power transmitter (101) of any previous embodiment wherein the set of timing gaps are comprised in the power transfer time interval.

Embodiment 4. The power transmitter (101) of any previous embodiment wherein the set of timing gaps comprises a predetermined pattern of a plurality of timing gaps.

Embodiment 5. The power transmitter (101) of embodiment 4 wherein the predetermined pattern is a pattern of a plurality of timing gaps having a same duration and having a same time difference between consecutive timing gaps of the same repeating time frame.

Embodiment 6. The power transmitter (101) of embodiment 4 or 5 wherein the predetermined pattern is selected from a plurality of predetermined patterns.

Embodiment 7. The apparatus of any previous embodiment and the power transfer driver (201) is arranged to be supplied by a time varying power supply signal and the communication driver (205) is arranged to synchronize a timing of the set of timing gaps to the varying power supply signal.

Embodiment 8. The power transmitter (101) of any previous embodiment wherein the communication driver (205) is arranged to synchronize an end of a timing gap of the set of timing gaps to and end of the power transfer time interval.

Embodiment 9. The power transmitter (101) of any previous embodiment wherein the power transmitter (101) is arranged to exchange a configuration message with the power receiver (105), the configuration message comprising an indication of a property of at least one timing gap of the plurality of timing gaps.

Embodiment 10. The power transmitter (101) of any previous embodiment wherein the total combined duration of the timing gaps is no more than 5% of a duration of the power transfer time intervals.

Embodiment 11. A power receiver (105) for wirelessly receiving power from a power transmitter (101) via an electromagnetic power transfer signal, power transfer signal employing a repeating time frame comprising at least a power transfer time interval and a communication time interval, the power transfer signal being present during the power transfer time intervals and not present during communication time intervals, the power receiver (105) comprising:

an inductive power extraction element (107) arranged to extract power from the power transfer signal during power transfer time intervals of a power transfer phase;

a communication coil (309) for receiving a received communication carrier signal, the communication carrier signal being present during communication time intervals and during the power transfer time intervals except for during a set of timing gaps during which no communication carrier signal is present, a total combined duration of the timing gaps being no more than 50% of a duration of the power transfer time intervals;

a communication unit (307) arranged to communicate with the power transmitter using modulation of the communication carrier signal during the communication time intervals;

a synchronizer (313) arranged to synchronize an operation of the power receiver to a timing of the set of timing gaps.

Embodiment 12. The power receiver further comprising a power extractor (311) coupled to the communication coil (309) and arranged to extract a power signal from the communication coil (309) and to provide supply a circuit of the power receiver by the power signal.

Embodiment 13. A wireless power transfer system comprising a power transmitter in accordance with any of embodiments 1-10 and a power receiver in accordance with any of embodiments 11 and 12.

Embodiment 14. A method of operation for a power transmitter (101) wirelessly providing power to a power receiver (105) via an inductive power transfer signal, the method comprising:

a power transfer coil (103) generating the power transfer signal;

generating a power transfer drive signal for the power transfer coil (103), the drive signal during a power transfer phase being generated to employ a repeating time frame comprising at least a power transfer time interval and a communication time interval, the power transfer drive signal being generated to be present during the power transfer time intervals but not during communication time intervals;

a communication coil (207) generating a communication carrier signal;

generating a communication drive signal for the communication coil to generate the communication carrier signal;

communicating with the power receiver (105) using modulation of the communication carrier signal during communication time intervals;

wherein the communication drive signal is generated to be present during communication time intervals and during the power transfer time intervals except for during a set of timing gaps during which no communication drive signal is generated, a total combined duration of the set of timing gaps being no more than 50% of a duration of the power transfer time intervals.

Embodiment 15. A method of operation for a power receiver (105) wirelessly receiving power from a power transmitter (101) via an electromagnetic power transfer signal, power transfer signal employing a repeating time frame comprising at least a power transfer time interval and a communication time interval, the power transfer signal being present during the power transfer time intervals and not present during communication time intervals, the power receiver (105) comprising:

extracting power from the power transfer signal during power transfer time intervals of a power transfer phase;

a communication coil (309) receiving a received communication carrier signal, the communication carrier signal being present during communication time intervals and during the power transfer time intervals except for during a set of timing gaps during which no communication carrier signal is present, a total combined duration of the timing gaps being no more than 50% of a duration of the power transfer time intervals;

communicating with the power transmitter using modulation of the communication carrier signal during the communication time intervals; and synchronizing an operation of the power receiver to a timing of the set of timing gaps.

The invention claimed is:

1. A device comprising:

a power transfer coil, wherein the power transfer coil is arranged to generate a power transfer signal;

a power transfer driver, wherein the power transfer driver is arranged to generate a power transfer drive signal for the power transfer coil, wherein the power transfer drive signal uses a plurality of repeating time frames during a power transfer phase, wherein each of the plurality of repeating time frames comprises at least a power transfer time interval and a communication time interval, wherein the power transfer driver is arranged to generate the power transfer drive signal during the power transfer time interval and to not generate the power transfer drive signal during the communication time interval;

a communication coil, wherein the communication coil is arranged to generate a communication carrier signal;

a communication driver, wherein the communication driver is arranged to generate a communication drive signal for the communication coil so as to generate the communication carrier signal; and a communication processor, wherein the communication processor is arranged to communicate with a power receiver using modulation of the communication carrier signal;

wherein the communication driver is arranged to generate the communication drive signal during the communication time interval and during the power transfer time interval except for a plurality of timing gaps, wherein a total combined duration of the plurality of timing gaps is no more than 50% of a duration of the power transfer time interval, wherein the plurality of timing gaps comprises a predetermined pattern.

2. The device of claim 1, wherein the communication driver is arranged to generate the communication drive signal such that a first timing gap of the plurality of timing gaps has a fixed time offset to a timing of the power transfer time interval.

3. The device of claim 1, wherein the power transfer time interval comprises the plurality of timing gaps.

4. The device of claim 1, wherein the predetermined pattern has a same duration and a same time difference between consecutive timing gaps in each of the plurality of repeating time frames.

5. The device of claim 1, wherein the predetermined pattern is selected from a plurality of predetermined patterns.

6. The device of claim 1, wherein the power transfer driver is supplied by a time varying power supply signal, wherein the communication driver synchronizes a timing of the plurality of timing gaps to the varying power supply signal.

7. The device of claim 1, wherein the communication driver is arranged to synchronizes an end of a timing gap of the plurality of timing gaps to and end of the power transfer time interval.

8. The device of claim 1, wherein the communication processor is arranged to exchange a configuration message with the power receiver, wherein the configuration message comprises an indication of a property of at least one timing gap of the plurality of timing gaps.

9. The device of claim 1, wherein the total combined duration of the plurality of timing gaps is no more than 5% of a duration of the power transfer time interval.

10. A device comprising:

an power extraction circuit, wherein the power extraction circuit is arranged to extract power from a power transfer signal during at least one power transfer time interval, wherein the power transfer signal comprise a plurality of repeating time frames of a power transfer phase, wherein each of the plurality of repeating time frames comprises the power transfer time interval and a communication time interval, wherein the power transfer signal is present during the power transfer time interval and not present during the communication time interval;

a communication coil, wherein the communication coil is arranged to receive a communication carrier signal, wherein the communication carrier signal is present during the communication time interval and during the power transfer time interval except for a plurality of timing gaps, wherein a total combined duration of the timing gaps is no more than 50% of a duration of the power transfer time interval;

a communication circuit, wherein the communication circuit is arranged to communicate with the power transmitter using modulation of the communication carrier signal during the communication time interval; and a synchronizer circuit, wherein the synchronizer circuit is arranged to synchronize an operation of the power receiver to a timing of the plurality of timing gaps, wherein the plurality of timing gaps comprises a predetermined pattern.

11. The device of claim 10, further comprising a power extractor circuit, wherein the power extractor circuit is coupled to the communication coil, wherein the power extractor circuit is arranged to extract a power signal from the communication coil, wherein the power extractor circuit is arranged to provide power to the device.

12. A method comprising:

generating a power transfer signal during a power transfer phase, wherein the power transfer phase uses a plurality of repeating time frames, wherein each of the plurality of repeating time frames comprises at least a power transfer time interval and a communication time interval, wherein the power transfer signal is generated during the power transfer time interval but not during the communication time interval;

generating a communication carrier signal;

communicating with a power receiver using modulation of the communication carrier signal;

wherein the communication is present during the communication time interval and during the power transfer time interval except for a plurality of timing gaps, wherein a total combined duration of the plurality of timing gaps is no more than 50% of a duration of the power transfer time interval, wherein the plurality of timing gaps comprises a predetermined pattern.

13. A method comprising:

extracting power from the power transfer signal during at least one power transfer time interval, wherein the power transfer signal comprise a plurality of repeating time frames of a power transfer phase, wherein each of the plurality of repeating time frames comprises the power transfer time interval and a communication time interval, wherein the power transfer signal is present during the power transfer time interval and not present during the communication time interval;

receiving a communication carrier signal, wherein the communication carrier signal is present during the communication time interval and during the power transfer time interval except for a plurality of timing gaps, wherein a total combined duration of the timing gaps is no more than 50% of a duration of the power transfer time interval;

communicating with the power transmitter using modulation of the communication carrier signal during the communication time interval; and synchronizing an operation of the power receiver to a timing of the plurality of timing gaps, wherein the plurality of timing gaps comprises a predetermined pattern.

14. The device of claim 10, wherein a first timing gap of the plurality of timing gaps has a fixed time offset to a timing of the power transfer time interval.

15. The device of claim 10, wherein the power transfer time interval comprises the plurality of timing gaps.

16. The device of claim 10, wherein the predetermined pattern has a same duration and a same time difference between consecutive timing gaps in each of the plurality of repeating time frames.

17. The device of claim 10, wherein the predetermined pattern is selected from a plurality of predetermined patterns.

18. The device of claim 10, wherein a timing of the plurality of timing gaps to the varying power supply signal.

19. The device of claim 10, wherein an end of a timing gap of the plurality of timing gaps is synchronized to and end of the power transfer time interval.

20. The device of claim 10, wherein the communication circuit is arranged to exchange a configuration message with a power transmitter, wherein the configuration message comprises an indication of a property of at least one timing gap of the plurality of timing gaps.

21. The device of claim 10, wherein the total combined duration of the plurality of timing gaps is no more than 5% of a duration of the power transfer time interval.

22. A non-transitory computer-readable medium storing a computer program, wherein the computer program when executed on a processor performs the method as claimed in claim 12.

23. The method of claim 12, further comprising generating the communication drive signal such that a first timing gap of the plurality of timing gaps has a fixed time offset to a timing of the power transfer time interval.

24. The method of claim 12, wherein the power transfer time interval comprises the plurality of timing gaps.

25. The method of claim 12, wherein the predetermined pattern has a same duration and a same time difference between consecutive timing gaps in each of the plurality of repeating time frames.

26. The method of claim 12, wherein the predetermined pattern is selected from a plurality of predetermined patterns.

27. The method of claim 12, further comprising supplying a time varying power supply signal, wherein the communication driver synchronizes a timing of the plurality of timing gaps to the varying power supply signal.

28. The method of claim 12, further comprising synchronizing an end of a timing gap of the plurality of timing gaps to and end of the power transfer time interval.

29. The method of claim 12, further comprising exchanging a configuration message with the power receiver, wherein the configuration message comprises an indication of a property of at least one timing gap of the plurality of timing gaps.

30. The method of claim 12, wherein the total combined duration of the plurality of timing gaps is no more than 5% of a duration of the power transfer time interval.

31. A non-transitory computer-readable medium storing a computer program, wherein the computer program when executed on a processor performs the method as claimed in claim 13.

32. The method of claim 13, wherein a first timing gap of the plurality of timing gaps has a fixed time offset to a timing of the power transfer time interval.

33. The method of claim 13, wherein the power transfer time interval comprises the plurality of timing gaps.

34. The method of claim 13, wherein the predetermined pattern has a same duration and a same time difference between consecutive timing gaps in each of the plurality of repeating time frames.

35. The method of claim 13, wherein the predetermined pattern is selected from a plurality of predetermined patterns.

36. The method of claim 13, wherein a timing of the plurality of timing gaps to the varying power supply signal.

37. The method of claim 13, wherein an end of a timing gap of the plurality of timing gaps is synchronized to and end of the power transfer time interval.

38. The he method of claim 13, further comprising exchanging a configuration message with a power transmitter, wherein the configuration message comprises an indication of a property of at least one timing gap of the plurality of timing gaps.

39. The method of claim 13, wherein the total combined duration of the plurality of timing gaps is no more than 5% of a duration of the power transfer time interval.

* * * * *